A. B. COLVER.
Cultivator.

No. 162,273.  Patented April 20, 1875.

UNITED STATES PATENT OFFICE.

AMOS B. COLVER, OF ALBANY, OREGON.

IMPROVEMENT IN CULTIVATORS.

Specification forming part of Letters Patent No. 162,273, dated April 20, 1875; application filed January 30, 1875.

*To all whom it may concern:*

Figure 1:
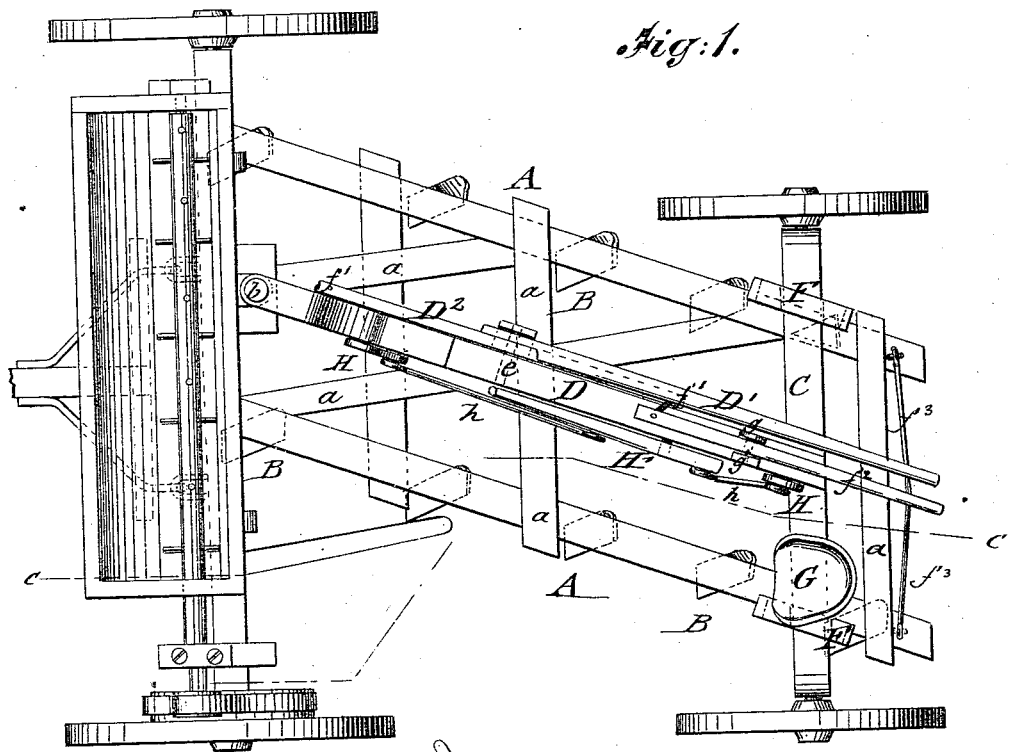
Figure 2:
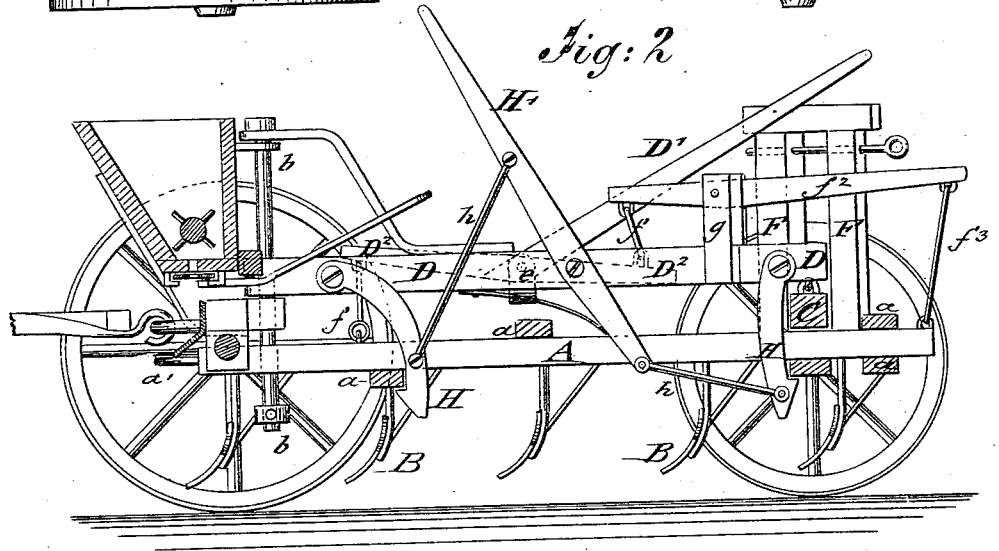

Be it known that I, AMOS B. COLVER, of Albany, in the county of Linn and State of Oregon, have invented a new and Improved Cultivator, of which the following is a specification:

In the accompanying drawing, Fig. 1 represents a top view of my improved cultivator, and Fig. 2 a vertical longitudinal section of the same on the line $c\ c$, Fig. 1.

Similar letters of reference indicate corresponding parts.

My invention relates to an improvement in cultivators, and consists mainly in the mode of raising and lowering the entire plow-frame and attaching it to the wheel-frame.

In the drawing, A represents the plow-frame, which is arranged under suitable angle of inclination to the longitudinal axis or line of draft of the cultivator, and constructed of sufficient strength and size for supporting a suitable number of shares, B, at the longer sides thereof. Plow-frame A is braced and stiffened by lateral and diagonal pieces $a$ and connected to the wheel-frame C in such a manner that it may be readily raised or lowered from the driver's seat. The wheel-frame C consists of a main beam, D, which connects the hind axle with the front wheels, under the same angle of inclination as plow-frame A. The front end of main beam D is, by the plow-frame king-bolt $b$, attached either to the axle of the front wheels at one side of the center thereof, or, if used without front wheels, provided with a front-supporting guide-wheel. The cultivator is drawn in the former case by two horses in the usual manner; in the latter case by one or two horses hitched to a front staple or clevis, $a'$, of the diagonal brace $a$ of the plow-frame, as shown in Fig. 2. The rear bolster or axle is attached to the main beam D in suitable manner. Plow-frame A is thrown in and out of work by means of an inclined main lever, $D^1$, which is attached centrally to the bar $D^2$, and pivoted therewith to the side of beam D, at $e$. The front end of extension-bar $D^2$ connects, by a link, $f$, with the front part of plow-frame A, and, by a link, $f^1$, at the rear end, with a supplementary lever, $f^2$, that is fulcrumed to standards $g$ at beam D, and connected, by spreading pivoted rods $f^3$, with the rear ends of frame A. The plow-frame A slides with its front part along king-bolt $b$, and with its rear part, by means of upright guide-frames F, having lateral top and bottom rods for defining extent of motion, vertically along the rear-supporting axle. When the main lever $D'$ is lifted by the driver from the seat G on the rear axle, the whole plow-frame is acted upon by the connecting front and rear links, and lowered toward the ground for the work of the plows. By pressing the main lever down, the plow-frame is raised to sufficient length above the ground. The lateral pieces of frame A are then engaged by hooks H, which are pivoted to the main beam D, and connected, by pivoted lever-rods $h$, to a fulcrumed spring-acted lever, H′, being retained in raised position until the lever H′ is carried back by the driver for the release of the hooks.

The cultivators may be used with or without a seed-dropper, which would be attached to the front axle, and constructed of a hopper, stirrers, seed-regulating mechanism, &c., operated in connection with the front wheels in the usual manner, as shown in Figs. 1 and 2.

The ready application of the plows to the ground, in connection with the number of plows and the strength of frame, makes this cultivator an effective and time-saving implement for farming purposes.

Having thus described my invention, what I claim as new, and desire to secure by Letters Patent, is—

1. As an improvement in cultivators, the combination of the obliquely-arranged plow-frame A, sliding on front king-bolt $b$, and by rear guide-frames F on the rear axle, with the supporting main beam D, and operating lever $D^1\ D^2$, and frame connecting-rods, for raising and lowering the plows as required, substantially in the manner and for the purpose set forth.

2. The combination of sliding plow-frame A with main beam D, and pivoted supporting-hooks H operated by spring-acted lever H′, for locking plow-frame in raised position, substantially as set forth.

AMOS B. COLVER.

Witness:
THOMAS FROMAN,
G. A. HILL.